United States Patent
Idris et al.

(12) 
(10) Patent No.: US 10,725,538 B2
(45) Date of Patent: Jul. 28, 2020

(54) INTERACTING WITH GAME ELEMENTS USING EYE MOVEMENT TRACKING

(71) Applicant: IGT, Las Vegas, NV (US)

(72) Inventors: Fayez Idris, Dieppe (CA); David Small, Moncton (CA)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/011,890

(22) Filed: Jun. 19, 2018

(65) Prior Publication Data

US 2019/0384385 A1 Dec. 19, 2019

(51) Int. Cl.
- *G06F 3/01* (2006.01)
- *A63F 13/21* (2014.01)

(52) U.S. Cl.
CPC .............. *G06F 3/013* (2013.01); *A63F 13/21* (2014.09); *A63F 2300/10* (2013.01)

(58) Field of Classification Search
None
See application file for complete search history.

(56) References Cited

U.S. PATENT DOCUMENTS

| | | | |
|---|---|---|---|
| 6,943,754 B2 | 9/2005 | Aughey et al. | |
| 7,436,825 B2 | 10/2008 | Jeong et al. | |
| 8,562,136 B2 | 10/2013 | Blixt et al. | |
| 9,250,703 B2 | 2/2016 | Hernandez-Abrego | |
| 9,319,662 B2 | 4/2016 | Bathiche et al. | |
| 9,658,473 B2 | 5/2017 | Lewis | |
| 9,715,781 B2 | 7/2017 | Lyons et al. | |
| 2017/0169662 A1* | 6/2017 | Froy | G06F 3/005 |
| 2017/0293356 A1* | 10/2017 | Khaderi | A63F 13/212 |
| 2018/0299694 A1* | 10/2018 | Rousseau | A61B 3/113 |

FOREIGN PATENT DOCUMENTS

KR 20110035585 9/2009

\* cited by examiner

*Primary Examiner* — Stephen T. Reed
(74) *Attorney, Agent, or Firm* — Sage Patent Group

(57) ABSTRACT

A method of operating an electronic gaming machine includes displaying a moving object to a viewer on a display screen of the electronic gaming machine, detecting and tracking eye movement of the viewer in relation to the moving object over a predetermined time period, comparing the eye movement of the viewer in relation to the object over the predetermined time period to a displayed position of the object over the predetermined time period, and determining based on the comparison that the eye of the viewer in relation to the moving object is tracking the object. Related systems and devices are disclosed.

22 Claims, 10 Drawing Sheets

INTERACTING WITH GAME ELEMENTS USING EYE MOVEMENT TRACKING

FIELD

Embodiments described herein relate to the field of electronic gaming machines, and in particular to electronic gaming machines that track a player's eye position.

BACKGROUND

In casinos and other establishments, players may play wagering games using electronic gaming machines (EGMs), such as video gaming terminals. EGMs may include other types of systems, such as online gaming systems that enable users to play games using computer devices, such as desktop computers, laptops, tablet computers or smart phones, computer programs for use on a computer device, gaming consoles that are connectable to a display, such as a television or computer screen, and others.

EGMs may be configured to enable users to play games with a touch interface. Example games may be a slot machine game, which may involve a reel of symbols that may move by pulling a lever or pushing a button to activate the reel of symbols. A user may win a prize based on the symbols displayed on the reel. In addition to slot machine-style games, EGMs may be configured to enable users to play a variety of different types of games. For example, some EGMs are configured to provide a tile-matching game, a video poker game, a wheel of fortune game, or other style of game. To interact with a game component of the game, the user may have to press a button that is part of the machine hardware, or the user may have to touch a button displayed on a display screen.

To provide a more immersive and attractive gaming experience, EGM manufacturers have recently been increasing the size of video display screens, and in some cases incorporating three-dimensional display screens, in EGMs. Meanwhile, manufacturers have also been increasing the complexity of content that is displayed on EGMs as players demand more and more complex and visually stimulating content from wagering games. As EGMs and the content displayed on EGMs becomes more complex, there is an increasing need to provide more intuitive and functional systems and methods for players to interact with the EGMs.

SUMMARY

A method of operating an electronic gaming machine according to some embodiments includes displaying a moving object to a viewer on a display screen of the electronic gaming machine, detecting and tracking eye movement of the viewer in relation to the moving object over a predetermined time period, comparing the eye movement of the viewer in relation to the object over the predetermined time period to a displayed position of the object over the predetermined time period, and determining based on the comparison that the eye of the viewer in relation to the moving object is tracking the object.

The method may further include executing an action in a game on the electronic gaming machine in response to determining that the viewer is tracking the object.

Displaying a moving object may include displaying the moving object to move in a repeating predetermined pattern. The repeating predetermined pattern may include a closed geometric shape.

The method may further include displaying a second moving object to a viewer of the electronic gaming machine in a separate location from the first moving object during the predetermined time period.

Displaying the first moving object may include displaying the first moving object to move in a first repeating predetermined pattern, and displaying the second moving object may include displaying the second moving object to move in a second repeating predetermined pattern, wherein the first repeating predetermined pattern is different from the second repeating predetermined pattern.

Displaying the moving object may include causing the object to move in discontinuous motion from one display position to a next display position, and detecting saccadic motion of the eye of the viewer in response to the discontinuous motion of the object.

The method may further include determining a difference between a movement of the moving object and the detected eye movement of the viewer, and calibrating an eye movement tracking unit that performs viewer eye movement tracking in the electronic gaming machine in response to the difference between the movement of the moving object and the detected eye movement of the viewer.

The object may include a game component of a game operating on the electronic gaming machine, and the method may further include selecting the game component in response to determining based on the comparison that the viewer is visually tracking the object.

The method may further include determining a difference between a movement of the moving object and the detected eye movement of the viewer, and calibrating a game that operates on the electronic gaming machine in response to the difference between the movement of the moving object and the detected eye movement of the viewer.

The method may further include measuring a reaction speed of the eye movement of the viewer to movement of the object, and calibrating a game that operates on the electronic gaming machine in response to the difference between the movement of the moving object and the detected movement of the eye of the viewer.

Calibrating the game may include changing a visual aspect of the game, wherein the visual aspect of the game includes a size, color, speed and/or shape of a rendered game component.

Calibrating the game may include changing a visual aspect of the game, wherein the visual aspect of the game includes a background image, brightness, contrast, and/or gamma compensation of the display.

An electronic gaming machine according to some embodiments includes a game controller, a display device, a display controller coupled to the game controller and the display device, and an eye movement detection unit coupled to the game controller and configured to detect eye movement of the viewer. The game controller is configured to display a moving object to a viewer of the electronic gaming machine using the display device, detect movement of the eye of the viewer over a predetermined time period, compare the movement of the eye of the viewer over the predetermined time period to a displayed position of the three-dimensional object over the predetermined time period, and determine based on the comparison that the viewer is visually tracking the object.

The game controller may be further configured to execute an action in a game on the electronic gaming machine in response to determining that the viewer is visually tracking the object.

The game controller may be configured to display the moving object to move in a repeating predetermined pattern.

The game controller may further be configured to display a second moving object to a viewer of the electronic gaming machine in a separate location from the first moving object during the predetermined time period.

The game controller may further be configured to display the first moving object to move in a first repeating predetermined pattern and to display the second moving object to move in a second repeating predetermined pattern, wherein the first repeating predetermined pattern is different from the second repeating predetermined pattern.

The game controller may further be configured to cause the object to move in discontinuous motion from one display position to a next display position, and detect saccadic motion of the eye of the viewer in response to the discontinuous motion of the object.

The game controller may further be configured to determine a difference between a movement of the moving object and the detected eye movement of the viewer, and calibrate an eye movement tracking unit that performs eye movement tracking in the electronic gaming machine in response to the difference between the movement of the moving object and the detected eye movement of the viewer.

The object may include a game component of a game operating on the electronic gaming machine, and wherein the game controller may further be configured to select the game component in response to determining based on the comparison that the viewer is visually tracking the object.

The game controller may further be configured to determine a difference between a movement of the moving object and the detected eye movement of the viewer, and calibrate a game that operates on the electronic gaming machine in response to the difference between the movement of the moving object and the detected eye movement of the viewer.

The game controller may further be configured to measure a reaction speed of the eye movement of the viewer to movement of the object, and calibrate a game that operates on the electronic gaming machine in response to the difference between the movement of the moving object and the detected eye movement of the viewer.

The game controller may further be configured to calibrate the game by changing a visual aspect of the game, wherein the visual aspect of the game includes a size, color, speed and/or shape of a rendered game component.

The game controller may further be configured to calibrate the game includes changing a visual aspect of the game, wherein the visual aspect of the game includes a background image, brightness, contrast, and/or gamma compensation of the display.

Some embodiments provide a method of calibrating a eye movement tracking unit of an electronic gaming machine, including displaying a moving object to a viewer of the electronic gaming machine, detecting eye movement of the viewer over a predetermined time period, comparing the eye movement of the viewer over the predetermined time period to a displayed position of the three-dimensional object over the predetermined time period, determining a difference between a movement of the moving object and the detected eye movement of the viewer, and calibrating the eye movement tracking unit that in response to the difference between the movement of the moving object and the detected eye movement of the viewer.

DETAILED DESCRIPTION OF EMBODIMENTS

Figure 1:
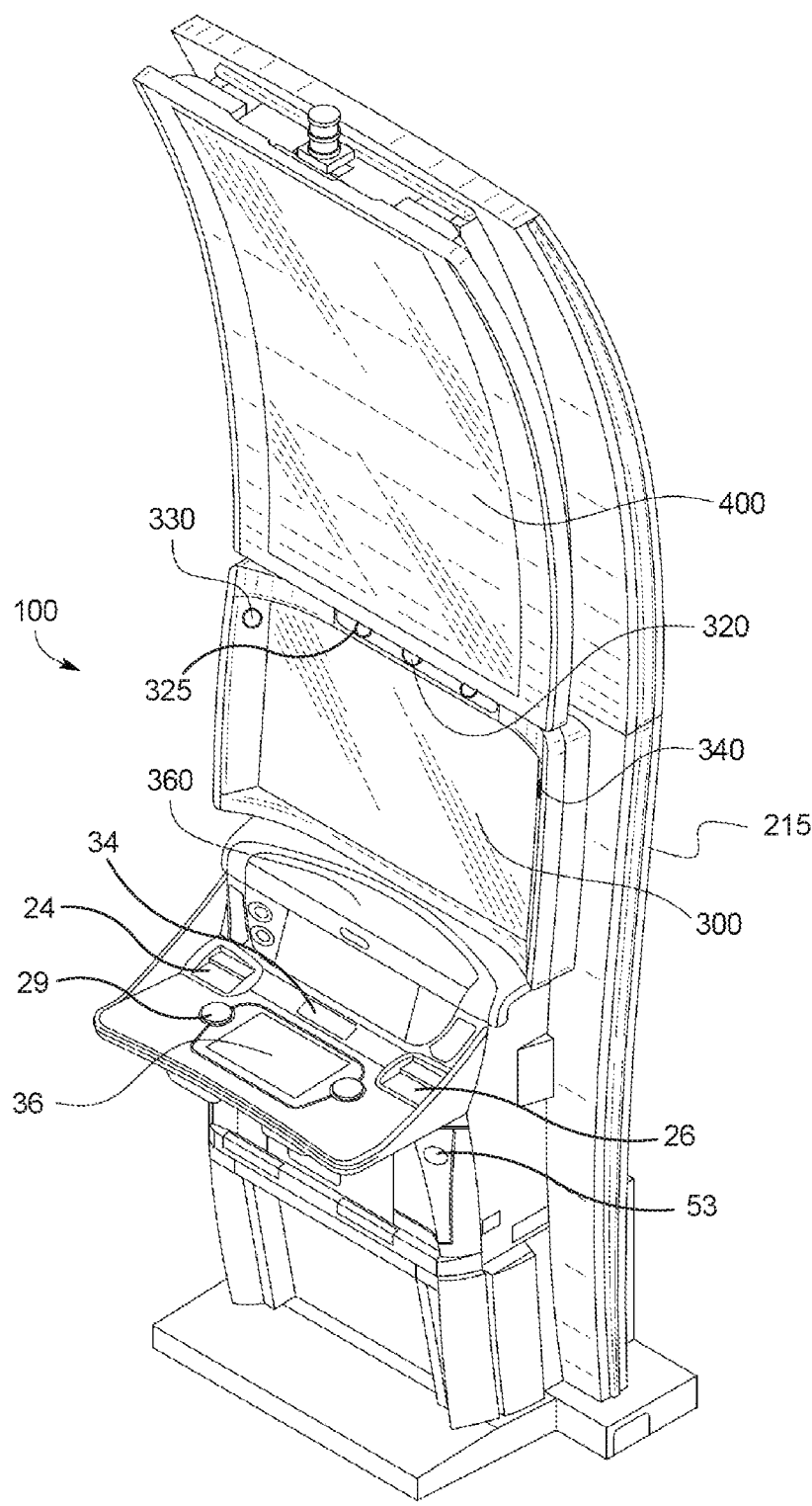
FIG. 1 is a perspective view of an electronic gaming machine according to some embodiments.

Embodiments described herein relate to enhanced electronic gaming machines (EGMs) that are capable of displaying game components in two or three dimensions. As used herein, a game component is any object, item, icon, avatar, image or other element that is displayed by a game operated on an electronic gaming machine, and may include game elements, such as reels, cards, tiles, etc., that are displayed during a current play of a game or other elements, such as information elements, counters, timers, etc., displayed during or between plays of a game.

Game components that are displayed in three dimensions have an apparent position, when viewed by a player of the EGM, that can be characterized using coordinates in a three-dimensional coordinate system, such as a Cartesian coordinate system, a cylindrical coordinate system or a spherical coordinate system. Embodiments of the inventive concepts will be described in the context of a Cartesian coordinate system; however, the inventive concepts are not limited thereto.

Accordingly, some embodiments of the inventive concepts provide methods of operating an EGM that display a moving game component to a viewer and track the viewer's eye movement relative to the movement of the game component. The systems/methods detect eye movement of a viewer and, from the eye movement data, determine that the viewer is looking at the game component or following the game component with their eyes. In response to determining that the viewer is following the game component, the systems/methods may take an action, such as selecting the game component, calibrating a game, calibrating an eye tracking system, or other action.

Although the viewer is described below primarily as a player of a game on the EGM, it will be appreciated that the viewer may not be actively engaged in playing a game on the EGM, but may be a bystander watching a game being played on the EGM or may be simply looking at the EGM while no game is in progress, such as when the EGM is in attract mode.

The EGM may include at least one data capture camera device that is configured to detect a head position of the player to facilitate detection of the player's eye location. The EGM may also include at least one further data capture camera device that is configured to track eye movement of the player to collect player eye movement data. Such monitoring may be performed continuously or selectively when eye movement data is needed. Player head position detection and eye movement tracking are described in more detail below.

The EGM may be configured with algorithms to process image data from the data capture camera devices to detect in real-time the position of the player's eyes in three-dimensional (3D) space and movement of the player's eyes. The position of the player's eyes may be the physical location of the player's eyes in 3D space. The movement of the player's eyes may be determined by identifying the player's pupils and tracking movement of the player's pupils.

In some embodiments, an eye movement tracking unit may perform the operations of processing image data from the data capture camera devices to detect in real-time the position of the player's eyes in three-dimensional (3D) space and the movement of the player's eyes.

It will be appreciated that eye movement tracking may be distinguished from "gaze detection." Gaze detection typically refers to determining a steady fixation of a player's gaze, such as on an object displayed on a 2D or 3D display. Gaze detection typically attempts to determine a steady line of sight of a player at a point of fixation, which is defined as the intersection of the player's line of sight with the display screen. In contrast, eye tracking measures movement of a player's eyes without particular regard to the player's line of sight. Accordingly, eye tracking may require fewer computing resources than gaze detection in some applications. Moreover, eye tracking may determine whether a player's eye movement is smooth (pursuit movement) or saccadic (choppy point-to-point movement).

A display controller in the EGM may dynamically update the rendering of the viewing area or a portion of the viewing area, initiate an action in a game, and/or calibrate a game based on the player eye movement data.

In some embodiments, eye movement data may be used to select an object, such as a game component, that is displayed to the player. Object selection may be performed by asking/prompting a player to move their eyes in a certain pattern to select an object. For example, a player may be asked to move his or her eyes in a triangular pattern to select a displayed object.

In some embodiments, eye movement tracking may be used as a diagnostic tool to obtain measurements that provide a quantitative indication of the player's vision, distraction and/or attention. For example, in a game that uses eye tracking for player interaction, a player might find the game difficult to play because of vision problems or because a player is distracted. Another player, who does not have vision issues, might find the same game very easy. A game which is too difficult or too easy may reduce the engagement of the player when playing the game, potentially causing the player to seek another game to play at a different video gaming terminal. A player's behavior or state, e.g., the player's level of attention or distraction, may be estimated using eye movement tracking data, and one or more aspects of the game may be modified to account for the player's state. For example, game transitions, game component movements and/or game play may be sped up or slowed down to match a player's state as determined by eye movement data.

In some embodiments, an EGM may use eye movement data to calculate one or more vision related metrics, such as response time, smoothness of object tracking, etc. These metrics may be used to characterize the state of the player's vision. The EGM may adapt a game program to the player's vision in number of ways, such as by altering one or more of a size of rendered game elements, colors, speed of moving game elements, and changing a required response time (reaction from the player) such that it matches the player's vision. This way the player may be provided with a more engaging experience that can be adapted according to player's vision capabilities. For skill-based games, this approach can also be used to measure a skill level of a player, and the game may be adapted to better match the player's skill.

The gaming enhancements described herein may be carried out using a physical EGM that may be embodied in a variety of forms, machines and devices including, for example, portable devices, such as tablets and smart phones, that can access a gaming site or a portal (which may access a plurality of gaming sites) via the Internet or other communication path (e.g., a local area network, LAN, or wide area network, WAN), and so on. The EGM may be located in various venues, such as a casino or an arcade.

Electronic Gaming Machines

In various embodiments of the present disclosure, an EGM can provide the enhanced physical player interaction in conjunction with one or more various game components (such as but not limited to game symbols, game cards, game reels, game wheels, game tiles, game dice, game chips, game balls, game selections, game characters, game awards, game outcomes, or other game objects) or other functional aspects or functionality provided by the EGM to or for the player, using a combination of player eye movement data and three-dimensional image manipulation.

Figure 2:
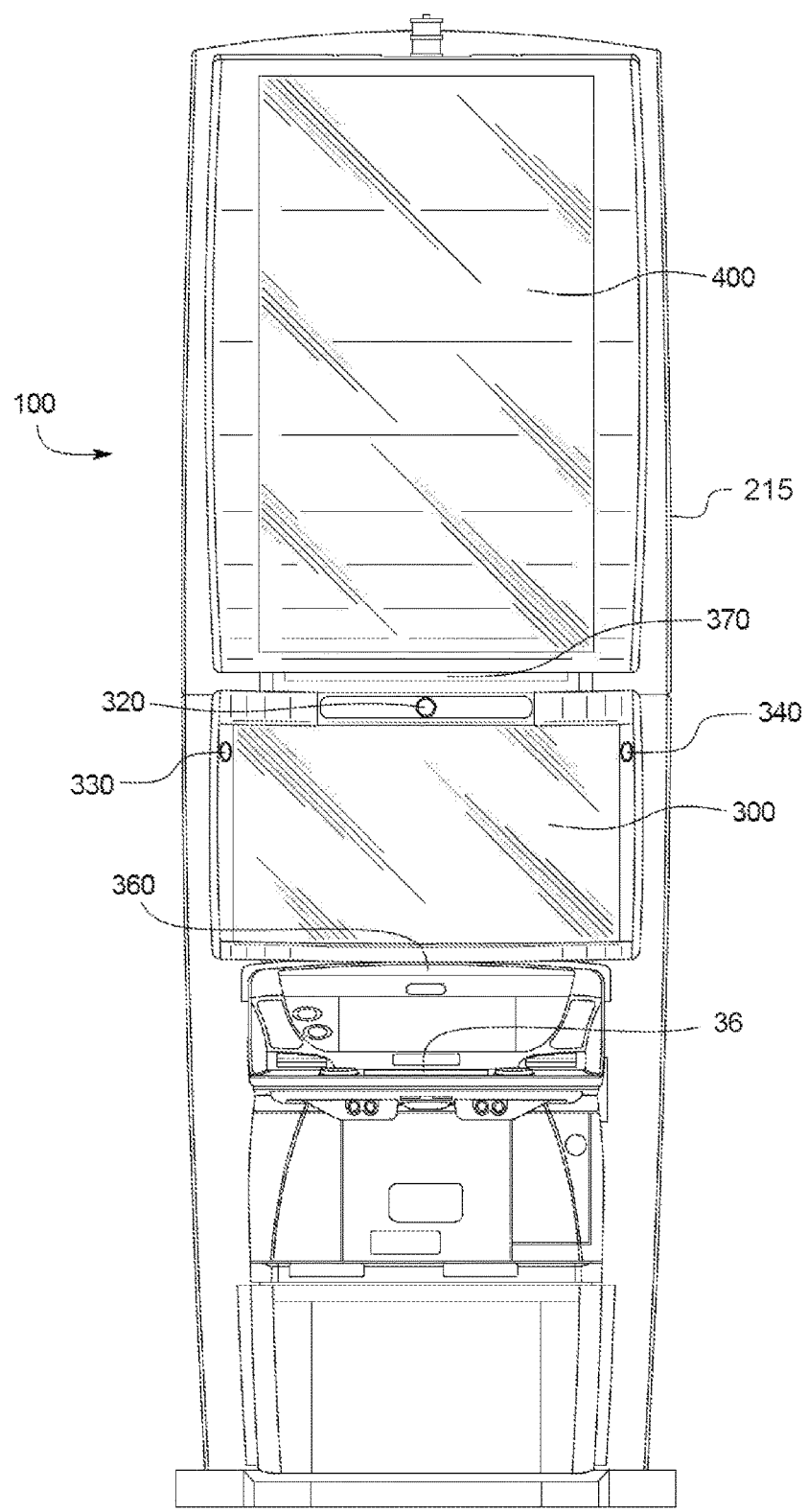
FIG. 2 is a front view of an electronic gaming machine according to further embodiments.
Figure 3:
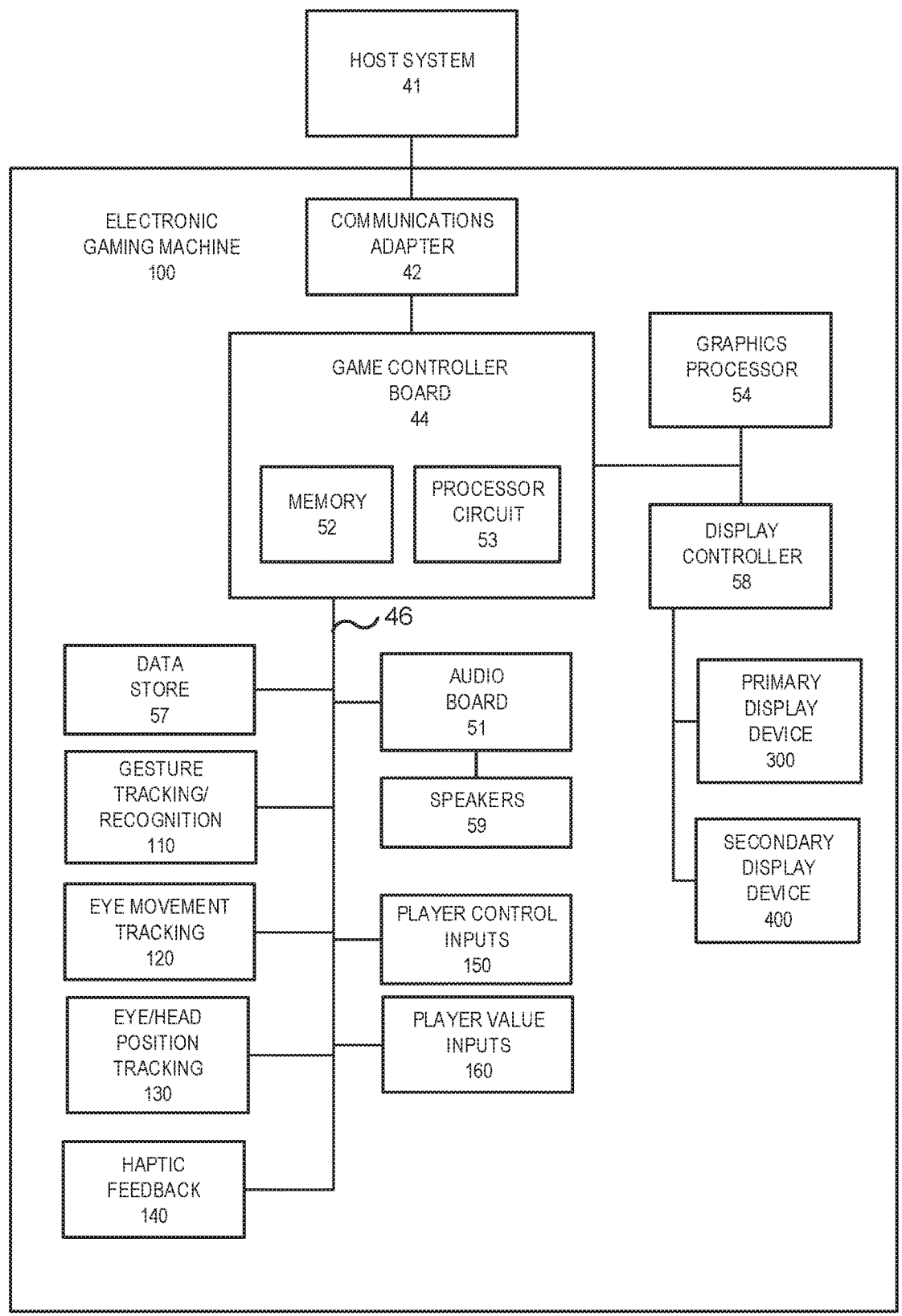
FIG. 3 is a schematic diagram of an electronic gaming machine linked to a casino host system according to some embodiments.

FIG. 1 is a perspective view and FIG. 2 is a front elevation of an EGM 100 that is configured to monitor eye movement of a player to collect player eye movement data, and to control the display of three-dimensional game components by the EGM in response to the player eye movement data in accordance with some embodiments. FIG. 3 is a block diagram illustrating some functional components of the EGM 100.

The example EGM 100 illustrated in FIGS. 1 and 2 generally includes a support structure or cabinet 215 that supports a plurality of output devices and a plurality of input devices of the EGM 100, among other components. The output devices include: a primary display device 300, and a secondary display device 400 positioned above the primary display device 300. A third or lower display device may be positioned below the first or intermediate display device 300. These output devices are configured to display the games, game outcomes, awards (such as the primary and secondary games awards or other game outcome awards), and other functionality and information to the player. In this illustrated example embodiment, the plurality of player input devices enable the player to play one or more wagering games provided by the EGM 100. Such player input devices can also include one or more input devices described below that are physically touchable or activatable by the player to enable the player to make inputs into the EGM 100. These output devices and input devices are configured such that a player may operate the EGM while standing or sitting, but preferably operates the EGM while the player is sitting in front of the EGM 100 such that the player's head is approximately at the same height as the primary display device 300.

Referring to FIGS. 1, 2 and 3, the primary display device 300, which is capable of displaying three-dimensional images to a player, may include a thin film transistor (TFT) display, a liquid crystal display (LCD), a cathode ray tube (CRT), autostereoscopic 3D display, a light emitting diode (LED) display, an organic LED (OLED) display, or any other type of display. The secondary display device 400 may be configured to display additional game content, non-game content, promotional content, or other content in addition to content displayed on the primary display device 300. The secondary display device 400 may have 2D display capabilities, 3D display capabilities, or both. The secondary display device 400 may provide static information, such as an advertisement for the game, the rules of the game, pay tables, pay lines, or other information, or may even display the main game or a bonus game along with the primary display device 300. Alternatively, the area for the secondary display device 400 may be a display glass for conveying information about the game. The primary display device 300 may also include a camera, sensor, and other hardware input devices. The display devices 300, 400 may display at least a portion of the visible game components of a plurality of interactive games.

In some embodiments, the primary display device 300 may be a touch sensitive display device. The player may interact with the primary display device 300 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the primary display device 300. As another example, the player may not have to touch the primary display device 300 to play the interactive game. The player may instead interact with the interactive game using their eye movement, eye gestures, and/or body movements, as described in more detail below.

The primary display device 300 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A game processor of the EGM 100 associates this X-Y location with a function to be performed. Such touch screens may be used for slot machines, for example, or other types of gaming machines. There may be an upper and lower multi-touch screen in accordance with some embodiments. One or both of display devices 300, 400 may be configured to have auto stereoscopic 3D functionality to provide 3D enhancements to the interactive game environment. The touch location positions may be 3D, for example, and mapped to at least one visible game component of the plurality of visible game components.

The EGM 100 may include a physical device for receiving and accepting value from a player, such as a coin, bill, token, printed ticket, magnetic card, or other token of value in return for which the player is granted credits on the EGM 100. For example, a ticket acceptor 24 includes an input slot that receives machine readable printed tickets and outputs printed tickets for use in cashless gaming. A bill acceptor 26 receives and validates paper money deposited by the player.

A coin tray (not shown) may receive coins or tokens from a hopper upon a win or upon the player cashing out. However, the EGM 100 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 100 may include a scanner for scanning a barcode indicative of a cryptocurrency address, such as a bitcoin, litecoin or ethereum address, to permit the EGM 100 to transfer credits to a player in the form of a cryptocurrency.

A card reader 34 may read from various types of cards, such as smart cards, magnetic strip cards, or other types of cards conveying machine readable information. The card reader reads the inserted card for player and credit information for cashless gaming. The card reader 34 may read a magnetic code on a conventional player tracking card, where the code uniquely identifies the player to a host system at the venue. The code is cross-referenced by the host system to any data related to the player, and such data may affect the games offered to the player by the gaming terminal. The card reader 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader 34 may be implemented in different ways for various embodiments. The card reader 34 may be an electronic reading device such as a player tracking card reader, a ticket reader, a banknote detector, a coin detector, or any other input device that can read an instrument supplied by the player for conveying a monetary amount. In the case of a tracking card, the card reader 34 detects the player's stored bank and applies that to the gaming machine being played. The card reader 34 or reading device may be an optical reader, a magnetic reader, or other type of reader. The card reader 34 may have a slot provided in the gaming machine for receiving the instrument. The card reader 34 may also have a communication interface (or control or connect to a communication interface) to digitally transfer tokens or indicia of credits or money via various methods such as RFID, tap, smart card, credit card, loyalty card, NFC and so on.

An electronic device may couple (by way of a wired or wireless connection) to the EGM 100 to transfer electronic data signals for player credits and the like. For example, near field communication (NFC) may be used to couple to EGM 100 which may be configured with NFC enabled hardware. This is a non-limiting example of a communication technique.

A touchpad 36 may accept player input, such as a personal identification number (PIN) or any other player information. The touchpad 36 may display a menu for instructions and other information and provides visual feedback of the keys pressed.

The EGM 100 may include a plurality of player control buttons 29 that include any buttons or other controllers needed to play the particular game or games offered by EGM 100 including, for example, a bet button, a repeat bet button, a spin reels (or play) button, a maximum bet button, a cash-out button, a display pay lines button, a display payout tables button, select icon buttons, and any other suitable button. The player control buttons 29 may in some embodiments be implemented as virtual buttons on a touch screen display.

The player control buttons 29 may be provided on the touchpad 36 or another digital button panel that may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

The EGM 100 may include an output device, such as one or more speakers 59. The speakers may be located in various locations on the EGM 100 such as in a lower portion or upper portion. The EGM 100 may have a chair or seat portion and the speakers may be included in the seat portion to create a surround sound effect for the player. The seat portion may allow for easy upper body and head movement during play. Functions may be controllable via an on screen game menu. The EGM 100 is configurable to provide full control over all built-in functionality (lights, frame lights, sounds, and so on).

Referring to FIG. 3, the EGM 100 is shown linked to the casino's host system 41 via network infrastructure.

The EGM 100 includes a data storage device 57 that stores game data for one or more three-dimensional interactive games. The data storage device 57 may store game data for one or more primary interactive games and one or more bonus interactive games. The EGM 100 includes a display controller 58 that detects a control command from a game controller 44 of the EGM and responsive to such command may dynamically update the rendering of the viewing area.

A communications adapter 42 may contain circuitry for coupling the EGM 100 to network. The communications adapter 42 may include a network interface allowing EGM 100 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. The EGM 100 may communicate over a network using a suitable protocol, such as the game-to-system (G2S) protocols.

The communications adapter 42 may communicate, transmit and receive data using a wireless transmitter, or it may be wired to a network, such as a local area network running throughout the casino floor, for example. The communications adapter 42 may set up a communication link with a master controller and may buffer data between the network and a game controller board 44. The communications adapter 42 may also communicate with a network server, such as in accordance with the G2S standard, for exchanging information to carry out embodiments described herein.

The game controller board 44 includes a memory 52 and a processor circuit 53 for carrying out program instructions stored in the memory and for providing the information requested by the network. Game data for one or more game programs may be stored in the memory 52. In addition, program modules for operating various subsystems of the EGM may be stored in the memory 52. The processor circuit 53 may be a multi-core processor including two or more independent processing units. Each of the cores in the processor circuit 53 may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. The game controller board 44 executes game routines using game data stores in a data store 57 accessible to the game controller board 44, and cooperates with a graphics processor 54 and a display controller 58 to provide games with enhanced interactive game components. The graphics processor 54 may have an integrated high-speed dedicated graphics memory.

Peripheral devices/boards in the EGM 100 may communicate with the game controller board 44 via a bus 46 using, for example, an RS-232 interface. Such peripherals may include player value input devices 160, which may include a bill/coin acceptor 26, a coin acceptor, and a smart card reader or other type of credit card reader 34, and player control inputs 150 (such as buttons or a touch screen). The EGM may further include one or more player identification input devices, such as a card reader for reading a player loyalty card, a biometric input, keypad, or other input device that allows the player to identify him or herself/

The player control inputs 150 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 300 may be a touch sensitive display device. The player control inputs 150 may be integrated with the display device 300 to detect player interaction input at the display device 300.

The game controller board 44 may also control one or more devices that produce the game output including audio and video output associated with a particular game that is presented to the user. For example, an audio board 51 may convert coded signals into analog signals for driving speakers.

The game controller board 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 100, or may reside at the host system 41. In some embodiments, the electronic data store storing game data may reside in the cloud.

The graphics processor 54 may be configured to generate and render animation game enhancements based on game data as directed by the game controller board 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 58. The graphics processor 54 may redraw various game enhancements as they dynamically update. The graphics processor 54 may cooperate with game controller board 44 and display controller 58 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye movement data, player eye gesture data, player movement data, or any combination thereof.

The display controller 58 may require a high data transfer rate and may convert coded signals to pixel signals for the display. The display controller 58 and the audio board 51 may be directly connected to parallel ports on the game controller board 44. The electronics on the various boards may be combined onto a single board. The display controller 58 may control output to one or more display device 300 (e.g. an electronic touch sensitive display device). The display controller 58 may cooperate with graphics processor 54 to render animation enhancements on the display device 300.

The display controller 58 may be configured to interact with graphics processor 54 to control the display device 300 to display a viewing area defining the interactive game environment including navigation to different views of the interactive game environment. Player control inputs may continuously detect player interaction commands to interact with interactive game environment. For example, the player may move a game component to a preferred position, select a game component, or manipulate the display of the game components.

The EGM 100 further includes functional units for performing various features described herein, including a gesture recognition unit 110, a eye movement tracking unit 120, an eye/head position tracking unit 130 and a haptic feedback unit 140, which are described in more detail below. Each of the functional units 110, 120, 130 and 140 may include a processing circuits, including signal processing units, and memory and/or storage that is separate from the processor circuit 53, memory 52 and/or data store 57 of the EGM 100, or may utilize resources of the game controller board including the processor circuit 53, memory 52 and/or data store 57 of the EGM 100.

Player Eye Tracking

Referring again to FIGS. 1 and 3, the EGM 100 may include an eye movement tracking unit 120 including at least one eye movement tracking camera 325 that is configured to continuously detect and monitor player eye movement of a player playing the EGM 100. Images from the eye movement tracking camera 325 are transmitted to the eye movement tracking unit 120 which determines a direction and/or speed of the player's eye movement using the data provided by the eye movement tracking camera 325. The eye movement tracking unit 120 may measure eye movement of the player's eyes using the data provided by the eye movement tracking camera 325, and the eye movement tracking unit 120 may provide player eye movement data to the game controller 44.

The eye movement tracking camera 325 may include a single detector configured to capture images of the player or players of the EGM 100 from a single direction or multiple detectors configured to capture images of the player or players from multiple directions. The EGM 100 may be configured to detect the presence and location of multiple players. Accordingly, eye movement data may be captured for multiple players of an EGM 100. Accordingly, the player eye movement data may include eye movement data of multiple players/viewers. It will be appreciated that any reference herein to a player/viewer in the singular may include multiple players/viewers.

In some embodiments, an infrared or near-infrared source 326 may be provided to illuminate the player's eyes with infrared or near-infrared light, and the eye movement tracking camera 325 may sense the infrared or near-infrared light reflected from the player's eyes. Infrared light generally refers to light having a wavelength of about 700 nm to about 1000 nm. Near-infrared light may have a wavelength of about 680 nm to about 700 nm or from about 1000 nm to about 1020 nm. By using infrared light to sense player eye movement, a player's eye movement can be sensed even if the player is wearing glasses or contact lenses and regardless of the player's eye color.

In some embodiments, the game controller 44 may cause the display controller 58 to dynamically update the rendering of the viewing area based on the player eye movement data. The display controller 58 may control the display device 300 using the graphics processor 54 to dynamically update the rendering of the viewing area to provide a graphical animation effect that alters the visible game components in the viewing area based on the player eye movement data. In some embodiments, the game controller 44 may provide a control command to the display controller 58 based on the eye movement or eye gesture of the player, or any combination thereof.

A winning outcome of the game for provision of an award may be triggered based on the eye gaze or eye gesture of the player. For example, by looking at a game component displayed by the display controller on the display device 300 for a pre-determined period of time, the player may trigger a winning outcome. The award may include credits, free games, mega pot, small pot, progressive pot, and so on.

The eye movement tracking unit 120 may be used for eye, gesture or motion tracking of player, such as detecting eye movement, eye gestures, player positions and movements, and generating signals defining x, y and z coordinates associated with the player's eye gaze. The EGM 100 may implement eye-tracking recognition technology using cameras, sensors (e.g. optical sensor), data receivers and other electronic hardware to capture various forms of player input. The eye movement or eye gesture by a player may interact with the interactive game environment or may impact the type of graphical animation effect. Accordingly, the EGM 100 may be configured to capture player eye movement input, eye gesture input, and movement input as player interaction commands.

In some embodiments, the eye movement tracking unit 120 may monitor the eye movement and/or eye gesture of two or more people, who may be two or more players of the interactive game, to collect the player eye movement data and/or player eye gesture data. The player eye gaze data and/or player eye gesture data may be used such that both players may be able to play the interactive game simultaneously. The interactive game may include aspects of both cooperative and competitive play.

As previously described, the eye movement tracking unit 120 may track movement of a player's eyes relative in real-time or near real-time.

Figure 4:
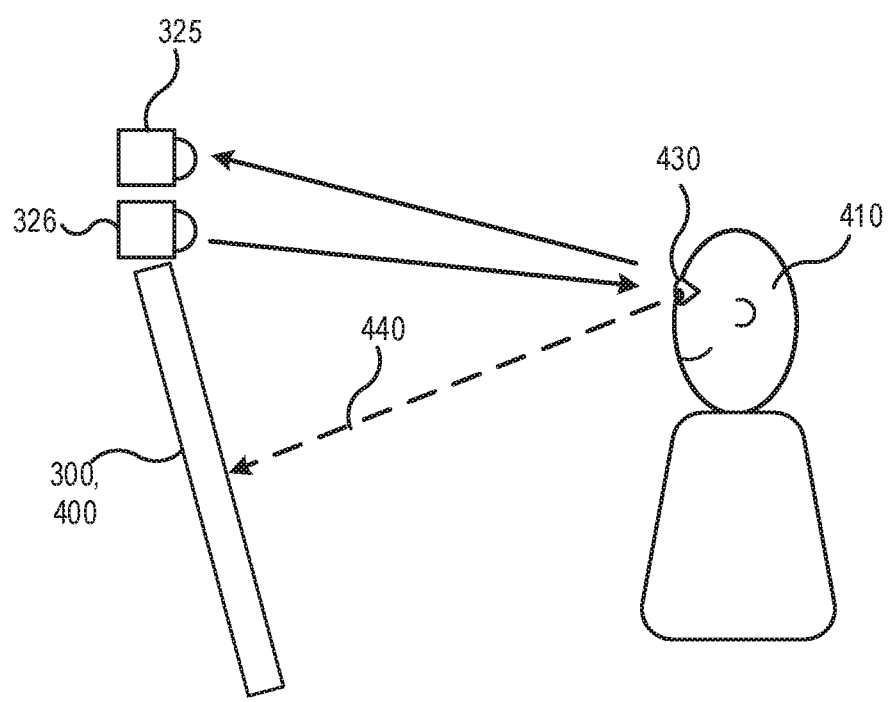
FIG. 4 is a schematic diagram illustrating a system for tracking a player's eye movement.

FIG. 4 illustrates a simplified model of a player 410 in front of an EGM including a primary display device 300 and/or a secondary display device 400. The player is looking along a direction 440 at a point on the display device 300, 400. In some embodiments, the eye movement tracking unit 120 may use the eye movement tracking camera 325 to track movement of the player's eyes 430 relative to EGM 100. Some embodiments may not need to track the instantaneous location of the gaze of the player, but only motion of the player's eyes. Applications of eye movement tracking, as opposed to gaze detection, are described below.

Object Tracking and Selection

Figure 5:
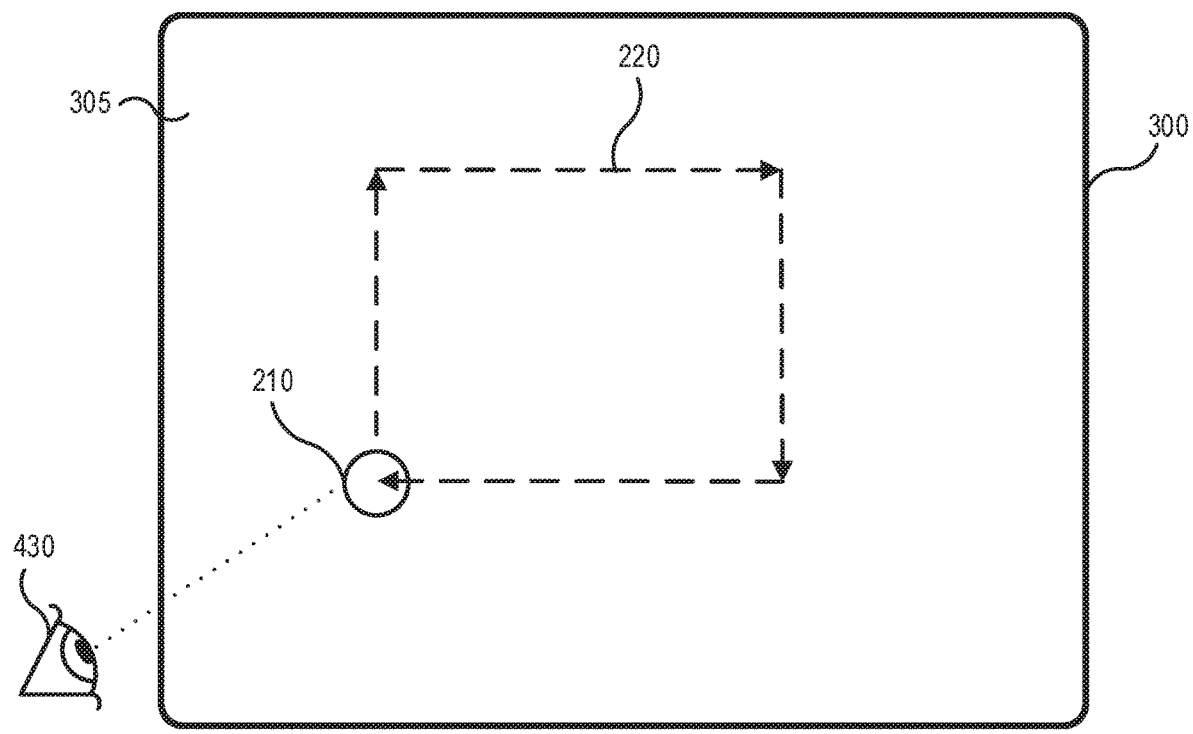
FIGS. 5, 6 and 7 illustrate display screens of an EGM on which moving objects are displayed for a player to track.
Figure 6:
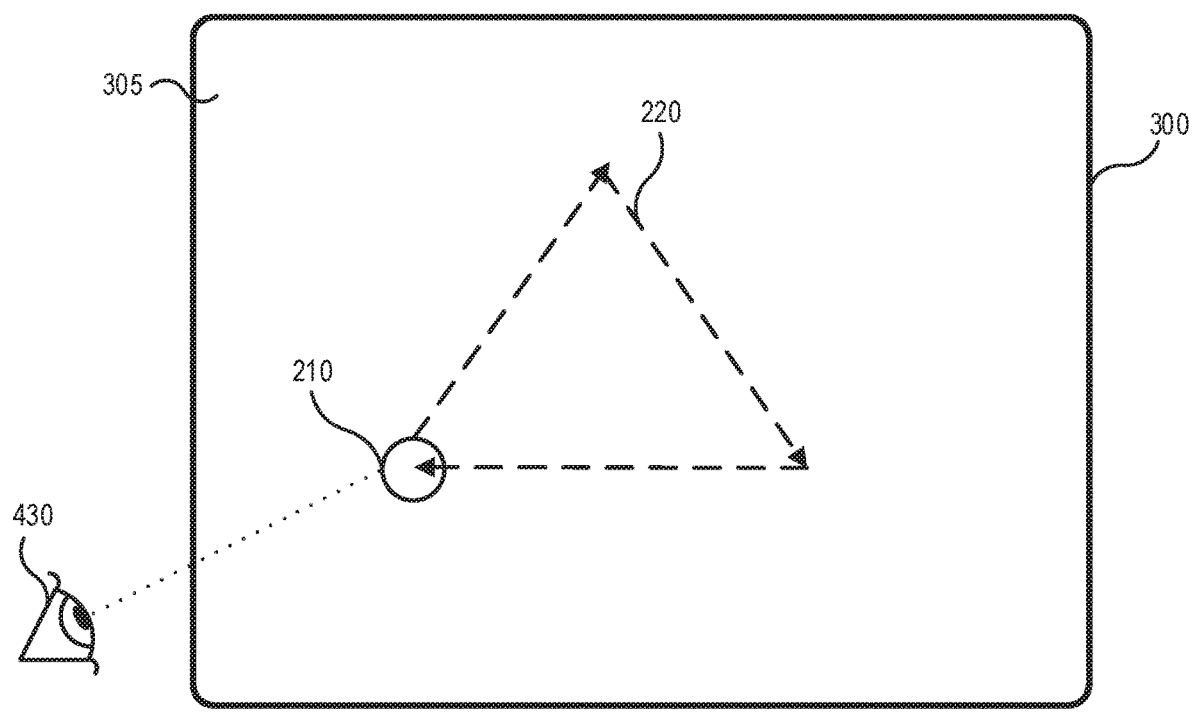

In some embodiments, an EGM 100 may use eye movement tracking to determine that a player is looking at particular displayed object, such as a game component. For example, FIG. 5 illustrates a display screen 305 on a primary display device 300 of an EGM 100. An object 210 is displayed on the screen 305 and moves in a predetermined pattern 220, which in this case is a rectangular pattern. In some embodiments, the moving object may be displayed to move in a repeating predetermined pattern, such as in a closed geometric shape. For example, as shown in FIG. 6, the predetermined pattern 220 may be a triangular pattern. In some cases, the pattern 220 may include one or more vertices at which the object abruptly changes directions. In other cases, the pattern may be a smooth curve that has no vertices or abrupt changes in direction.

Figure 8:
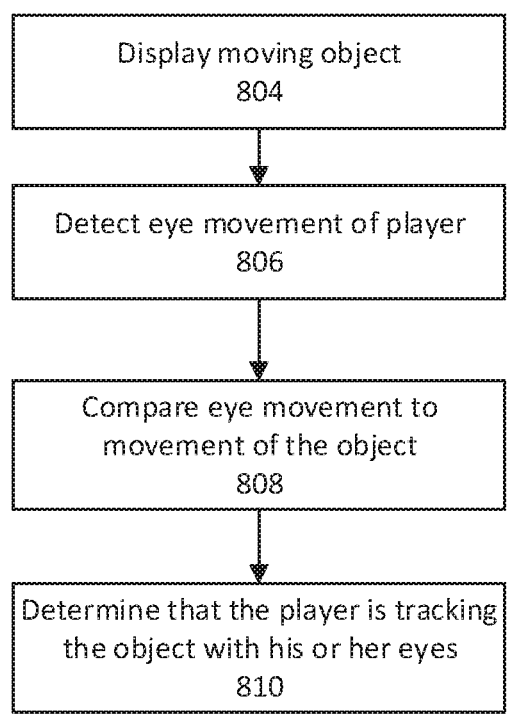
FIGS. 8 and 9 are block diagrams illustrating operations of systems/methods according to some embodiments.

When a player watches the object 210 move along the screen in the pattern 220, the player's eyes will follow a similar pattern. Thus, by detecting the movement of the player's eyes and comparing it to the movement of the object 210, the EGM 100 can determine that the player is looking at the object 210 without having to determine a gaze point of the player's eyes. Accordingly, referring to the flowchart of FIG. 8, a method of operating an EGM according to some embodiments includes displaying a moving object to a viewer on a display screen of the electronic gaming machine (block 804), detecting and tracking eye movement of the viewer in relation to the moving object over a predetermined time period (block 806), comparing the eye movement of the viewer in relation to the object over the predetermined time period to displayed movement of the object over the predetermined time period (block 808) and determining based on the comparison that the eye of the viewer in relation to the moving object is tracking the object (block 810).

The EGM 100 may execute an action in a game on the electronic gaming machine in response to determining that the viewer is tracking the object. For example, the EGM 100 may interpret the player's tracking of the object as indicating that the player wishes to select the object. For example, the object may represent a bonus award, and the EGM 100 may interpret the player's visual tracking of the object based on the player's eye movement as a selection of the bonus award.

Figure 7:
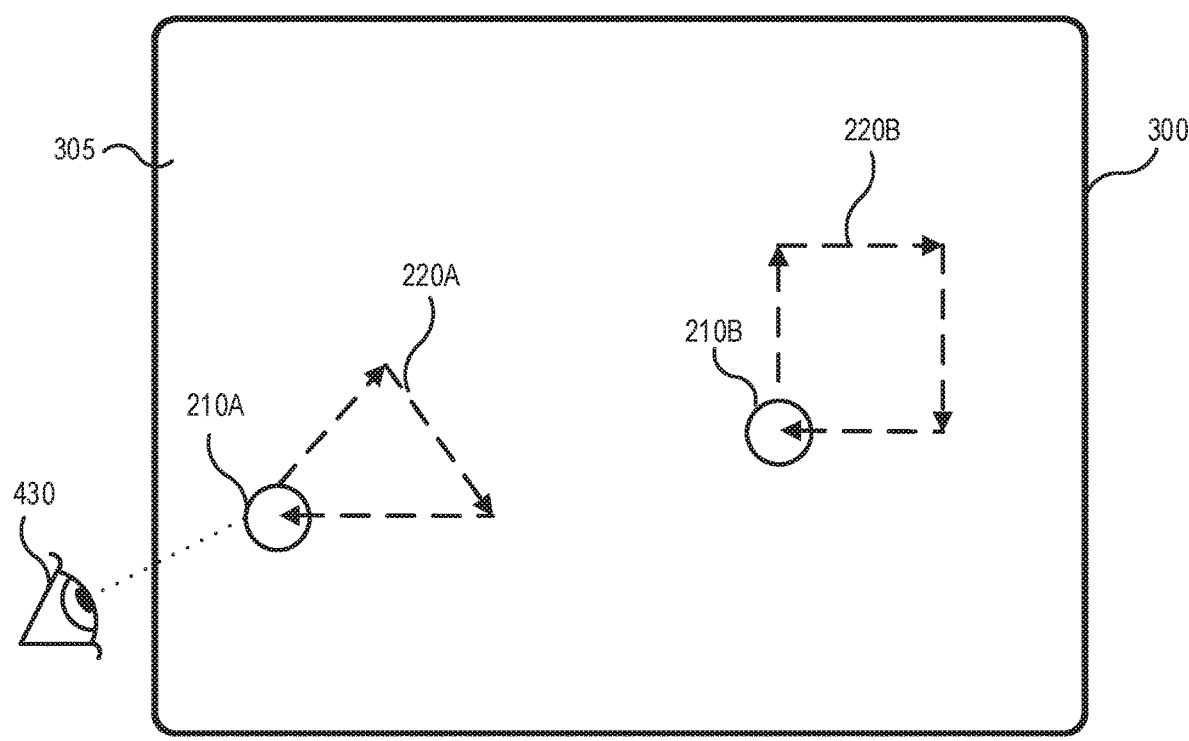

In some embodiments, multiple objects may be displayed on the display screen, and the EGM 100 may determine which object the player is tracking with his or her eyes based on eye movement of the player. Accordingly, in some embodiments, an EGM 100 may display a second moving object in a separate location from the first moving object at the same time as the first moving object is displayed. The first moving object may move in a first repeating predetermined pattern, and the second moving object may move in a second repeating predetermined pattern, wherein the first repeating predetermined pattern is different from the second repeating predetermined pattern. For example, FIG. 7 illustrates a display screen 305 on which two objects 210A and 210B are displayed and which move along predetermined patterns 220A, 220B, which have different shapes. In particular, the predetermined pattern 220A has a triangular shape, while the predetermined pattern 220B has a rectangular shape. Be determining, based on eye movement tracking data, whether the player's eyes are moving in a triangular pattern or a rectangular pattern, the EGM 100 can determine whether the player is visually tracking the first object 210A or the second object 210B.

In some embodiments, the moving objects may be displayed to move in smooth continuous fashion across the display screen. However, in other embodiments, the moving object may be displayed to move in discontinuous motion from one display position to a next display position. The eye movement tracking unit 120 may detect saccadic motion of the eye of the viewer in response to the discontinuous motion of the object.

In some embodiments, a similarity measure between motion of the player's eyes and motion of the objects on the screen may be generated by the EGM 100. The similarity measure may take the form of spatial similarity, temporal similarity and/or spatio-temporal similarity. Spatial similarity may be measured by measuring a correlation between a shape of a path traversed by the moving object and the shape of a path along which the player's eyes move. Temporal similarity may be measured by measuring a correlation between the speed of movement of the object and a speed of movement of the player's eyes. Spatio-temporal similarity may be measured by correlating both the shape of movement and speed of movement of the object and the player's eyes.

Eye Movement Tracking Unit Calibration

In some embodiments, the EGM may determine a difference between a movement of the moving object and the detected eye movement of the viewer, and calibrate the eye movement tracking unit that performs viewer eye movement tracking in the electronic gaming machine in response to the difference between the movement of the moving object and the detected eye movement of the viewer.

Figure 9:
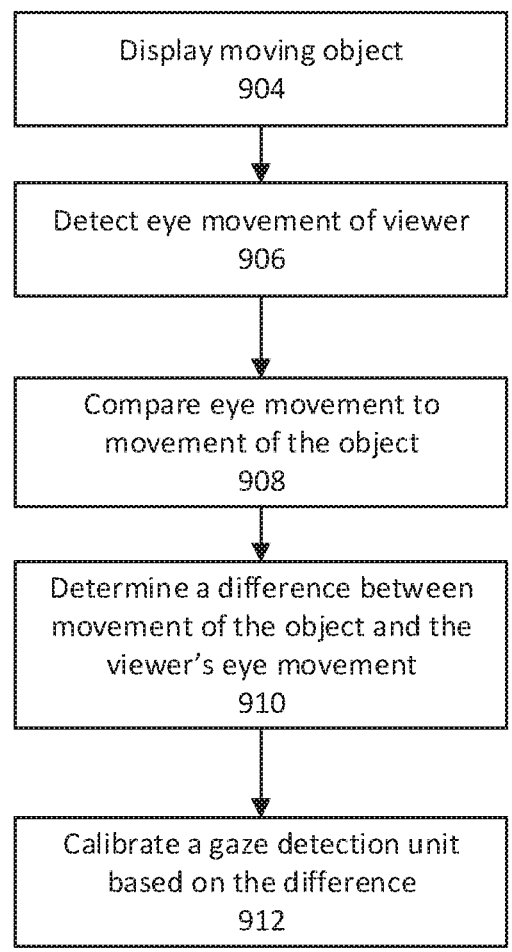

Referring to FIG. 9, a method of calibrating an eye movement tracking unit 120 of an EGM according to some embodiments includes displaying a moving object to a viewer of the electronic gaming machine (block 904), detecting eye movement of the viewer over a predetermined time period (block 906), comparing the eye movement of the viewer over the predetermined time period to a displayed position of the three-dimensional object over the predetermined time period (block 908), determining a difference between a movement of the moving object and the detected eye movement of the viewer (block 910), and calibrating the eye movement tracking unit that in response to the difference between the movement of the moving object and the detected eye movement of the viewer block (912).

Game Play Calibration

In some embodiments, an EGM may calibrate game play of a game on the EGM based on eye tracking data captured by the eye movement tracking unit 120. For example, in some embodiments, the EGM may determine a difference between a movement of a moving object and the detected eye movement of the viewer, and calibrate a game that operates on the electronic gaming machine in response to the difference between the movement of the moving object and the detected eye movement of the viewer.

In some embodiments, the EGM 100 may measure a reaction speed of the eye movement of the viewer to movement of the object, and calibrate a game that operates on the EGM 100 in response to the difference between the movement of the moving object and the detected movement of the eye of the viewer.

Calibrating the game may include changing a visual aspect of the game, such as a size, color, speed and/or shape of a rendered game component.

Calibrating the game may include changing a visual aspect of the game, wherein the visual aspect of the game includes a background image, brightness, contrast, and/or gamma compensation of the display.

To calibrate game play of a game on the EGM, the EGM may present the player with a training game or a set of training games to test the eye movement of the player. Such tests may measure a number of characteristics of the player's eye movement, such as whether the player can smoothly track the movement of an object, how quickly the player can acquire and track a moving object, how accurately the player can track the moving object, etc. For example, the EGM may display a smoothly moving object and ask the player to follow it on the screen. If, during this time, the player's eye movements include saccadic motion, such movements can indicate confusion and/or problems understanding the game. Conversely, if the ability to smoothly track a moving object may indicate a higher level of spatial attention. The speed and/or direction of the moving object may be varied during the test to find a point at which the player's ability to track the moving object deteriorates. Such a point may provide an upper bound of ability of the player to track objects on the screen, which can be used to calibrate the level of difficulty of a game displayed on the EGM.

In another example, a player may be shown an object and asked to press a button when the object is shown, and the time between when the when the object is shown and the players hits the button may be measured. This may provide an indication of the player's reaction time. In another example, two moving objects may be displayed, and the player may be asked to press a button when the two objects collide. This may provide an indication of the player's tracking ability and reaction time.

In games that require eye-hand coordination, the presentation of the game may be changed to accommodate players with fast eye-hand coordination as well as players with slower coordination. For example, if a player is slow to respond in the test game, then in a car racing game, a racing track could be adjusted to have fewer curves and cars in the game could move at slower speeds. This way the game is adapted to the player response.

As another example, in games where a player is required to visually track a moving object, the speed of the moving object could be adjusted such that it match the player's tracking capabilities.

In some embodiments, color preference and/or color perception may be measured, and colors of gaming elements and/or color contrasts may be changed to present the player with best colors possible. Because those measures will be carried in real-time, many features in the environment, which can affect the color appearance of objects, such as light, background, and/or surroundings may be taken into consideration to produce the best possible quality.

In some embodiments, a test may involve displaying shapes of different sizes, and asking a player to track the shapes as they move horizontally, vertically, diagonally or in a circular motion, by determining how accurately a player is tracking the objects based on the player's eye movements. If the player is tracking the objects in a highly accurate way, the EGM 100 may display smaller objects during a subsequent game. If the player's tracking was not accurate, the EGM 100 may display larger objects during a subsequent game.

In further embodiments, the EGM 100 may display an object moving at different speeds and ask the player to track the object. This test may determine how fast the player can move his or her eyes while maintaining tracking accuracy. In games which involve moving objects, the speed of the moving objects may be adjusted to match the speed of the player's eyes.

In still further embodiments, the EGM 100 may conduct a test to measure how fast a player could move his eyes from one location to another by displaying objects that appear at random positions on the display. Games which require finding objects that appear and disappear at different places, the time which determine how long the object would be displayed will be set in proportion to how fast a player could move his eyes from one location to another.

In further embodiments, an EGM 100 may conduct a test to measure if a player's eyes are lagging (behind) or leading (ahead) of a moving object while tracking the object. Based on the result of the test, the speed of moving objects during a game may be adjusted.

In still further embodiments, an EGM may conduct a test to measure a player's peripheral vision (field of view of a player). For example, a moving object may be displayed on the display screen and the player may be asked to follow the movement of the object. Simultaneously, a second object may be displayed in the player's peripheral field of view, and the player may be asked to press a button when the second object changes in some way (e.g., in size, color, shape, etc.). By tracking the eye movement of the player to ensure the player is following the moving object, the EGM 100 can measure the ability of the player to monitor objects using peripheral vision. Based on the results of this test, the EGM 100 may adapt locations of game components to the player's vision, e.g., placing the game components in the player's near-peripheral vision, mid-peripheral vision or far-peripheral vision.

Further Example Embodiments

Figure 10:
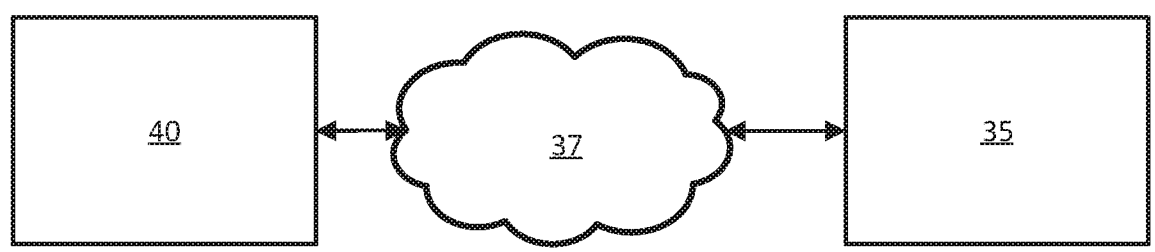
FIG. 10 is a block diagram illustrating an electronic gaming device according to some embodiments connected to a gaming server.

FIG. 10 illustrates an online implementation of a gaming system that may continuously monitor the eye movement of a player as described herein. The gaming system may be an online gaming device (which may be an example implementation of an EGM). As depicted, the gaming system includes a gaming server 40 and a gaming device 35 connected via a network 37. The eye movement of the player may be monitored and/or predicted by the gaming device 35 such that data relating to tracked positions, trajectories, etc. may be obtained as described herein.

In some embodiments, the gaming server 40 and the gaming device 35 cooperate to implement the functionality of EGM 100, described above. So, aspects and technical features of EGM 100 may be implemented in part at the gaming device 35, and in part at the gaming server 40.

The gaming server 40 may be configured to enable online gaming, and may include game data and game logic to implement the games and enhancements disclosed herein. For example, the gaming server 40 may include a player input engine configured to process player input and respond according to game rules. The gaming server 40 may include a graphics engine configured to generate the interactive game environment as disclosed herein. In some embodiments, the gaming server 40 may provide rendering instructions and graphics data to the gaming device 35 so that graphics may be rendered at gaming device 35.

The gaming server 40 may also include a movement recognition engine that may be used to process and interpret collected player eye movement data, player eye gesture data, and player movement data, to transform the data into data defining manipulations and player interaction commands.

The network 37 may be any network (or multiple networks) capable of carrying data including the Internet, Ethernet, POTS line, PSTN, ISDN, DSL, coaxial cable, fiber optics, satellite, mobile, wireless (e.g. WMAX), SS7 signaling network, fixed line, local area network, wide area network, and others, including any combination of these.

The gaming device 35 may be particularly configured with hardware and software to interact with the gaming server 40 via the network 37 to implement gaming functionality and render 2D or 3D enhancements, as described herein. For simplicity, only one gaming device 35 is shown but an electronic gaming system may include one or more gaming devices 35 operable by different players. The gaming device 35 may be implemented using one or more processors and one or more data stores configured with database(s) or file system(s), or using multiple devices or groups of storage devices distributed over a wide geographic area and connected via a network (which may be referred to as "cloud computing"). Aspects and technical features of the EGM 100 may be implemented using the gaming device 35.

The gaming device 35 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

The gaming device 35 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Gaming device 35 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The gaming device 35 may be operable to register and authenticate users (using a login, unique identifier, and password for example) prior to providing access to applications, a local network, network resources, other networks and network security devices. The computing device may serve one user or multiple users.

The gaming device 35 may include one or more input devices (e.g. player control inputs), such as a keyboard, mouse, camera, touch screen and a microphone, and may also include one or more output devices such as a display screen (with 3D capabilities) and a speaker. The gaming device 35 has a network interface in order to communicate with other components, to access and connect to network resources, to serve an application and other applications, and perform other computing applications.

The gaming device 35 connects to gaming server 40 by way of network 37 to access technical 2D and 3D enhancements to games as described herein. Multiple gaming devices 35 may connect to gaming server 40, each gaming device 35 operated by a respective player.

The gaming device 35 may be configured to connect to one or more other gaming devices through, for example, the network 37. In some embodiments, the gaming server 40 may be utilized to coordinate the gaming devices 35. Where gaming devices 35 may be utilized to facilitate the playing of a same game, such as an interactive game, wherein the interactive game includes at interaction between activities performed by the players on the gaming devices 35, various elements of information may be communicated across the network 37 and/or the server 40. For example, the elements of information may include player eye movement data, player eye gesture data, player movement data, and/or the viewing area displayed on the gaming device 35. This information may be used by each of the gaming devices 35 to provide and/or display interfaces that take into consideration the received data from another gaming device 35. The gaming devices 35 may be configured for cooperative and/or competitive play (or a combination thereof) between the players in relation to various game objectives, events, and/or triggers.

The locations where the EGM 100 may be used may have a variety of lighting conditions. For example, the EGM 100 may be used in a restaurant, a hotel lobby, an airport, and a casino. It may be brighter in some locations and darker in other locations, or the light quality may fluctuate from brightness to darkness. In some embodiments, EGM 100 may include an infrared light source that illuminates the player. The infrared light sources may not interfere with the eyes of the player. In some embodiments, the data capture camera device 25 may be an infrared data capture camera device. The infrared data capture camera device may collect player eye gaze data, player eye gesture data, and player movement data without being affected by the lighting conditions of the locations where EGM 100 may be used. In some embodiments, the EGM 100 may have a plurality of light sources providing a plurality of spectra of light, and the data capture camera device 25 may be a plurality of data capture camera devices configured to detect a plurality of spectra of light, so the data capture camera device 25 may collect player eye gaze data, player eye gesture data, and player movement data without being affected by the lighting conditions of the locations where EGM 100 may be used.

A player that plays an interactive game using EGM 100 may be wearing glasses. The glasses of the player may cause refractions of the light that illuminates the player. This may affect the data capture camera device 25 while it monitors the eye movement, eye gesture, and/or movement of the player. Glasses that comprise an infrared filter may also interfere with or affect the data capture camera device 25 while it monitors the eye gaze, eye gesture, and/or movement of the player. The EGM 100 may recognize that the player may be wearing glasses. For example, as the interactive game commences, display controller 58 may display on display device 300 using graphics processor 54 a question asking the player if he or she is wearing glasses. The player may provide input indicating whether he or she is wearing glasses, such as, but not limited to, with an audio command, touch command, or with the player's eye movement. As other example, the game controller 44 may recognize, based on processing the player eye movement data from the data capture camera device 25, that the light illuminating the player may be refracted, and may determine that the player is wearing glasses. When EGM 100 recognizes that the player may be wearing glasses, the game controller 44 may perform additional and/or more stringent filtering functions as described herein to account for the player's use of glasses and to accommodate the refractions of the light that illuminates the player. For example, the filter movement threshold may be set to be higher for players who wear glasses.

Further Definitions

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components.

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A method of operating an electronic gaming machine, comprising:
   displaying a first object and a second object to a viewer on a display screen of the electronic gaming machine, the first object and the second object each moving between different positions on the display screen in predetermined movements during a predetermined time period;
   detecting and tracking eye movement of the viewer during the predetermined time period;
   comparing the eye movement of the viewer during the predetermined time period to a displayed movement of the first object or a displayed movement of the second object on the display screen of the electronic gaming machine during the predetermined time period;

responsive to comparing the eye movement of the viewer during the predetermined time period to the displayed movement of the first object or the displayed movement of the second object on the display screen of the electronic gaming machine during the predetermined time period, determining that the viewer is visually tracking the first object based on a similarity of the eye movement of the viewer during the predetermined time period and the displayed movement of the first object on the electronic gaming machine during the predetermined time period; and executing an action in a game on the electronic gaming machine in response to determining that the eye of the viewer is visually tracking the first object.

2. The method of claim 1, wherein displaying the object comprises displaying the first object and/or the second object moving in a repeating predetermined pattern during the predetermined time period.

3. The method of claim 2, wherein the repeating predetermined pattern comprises a closed geometric shape.

4. The method of claim 1, further comprising displaying the second object to the viewer of the electronic gaming machine in a separate location on the display screen from the first object during the predetermined time period.

5. The method of claim 4, wherein displaying the first object comprises displaying the first object moving in a first repeating predetermined pattern,
   wherein displaying the second object comprises displaying the second object moving in a second repeating predetermined pattern, and
   wherein the first repeating predetermined pattern is different from the second repeating predetermined pattern.

6. The method of claim 1, wherein displaying the first object and the second object comprises causing the first object or the second object to move in a discontinuous motion from one display position to a next display position; and
   detecting saccadic motion of the eye of the viewer in response to the discontinuous motion.

7. The method of claim 1 further comprising:
   determining a difference between the displayed movement of the first object and the eye movement of the viewer during the predetermined time period; and
   calibrating an eye movement tracking unit that performs viewer eye movement tracking in the electronic gaming machine based on the difference between the displayed movement of the first object and the eye movement of the viewer during the predetermined time period.

8. The method of claim 1, wherein the first object comprises a game component of a game operating on the electronic gaming machine, the method further comprising selecting the game component in response to determining that the viewer is visually tracking the first object.

9. The method of claim 1, further comprising:
   determining a difference between the displayed movement of the first object and the eye movement of the viewer during the predetermined time period; and
   calibrating a game that operates on the electronic gaming machine based on the difference between the displayed movement of the first object and the eye movement of the viewer during the predetermined time period.

10. The method of claim 1, further comprising:
    measuring a reaction speed of the eye movement of the viewer to the displayed movement of the first object during the predetermined time period; and
    calibrating a game that operates on the electronic gaming machine in response to a difference between the displayed movement of the first object and the eye movement of the viewer during the predetermined time period.

11. The method of claim 10, wherein calibrating the game comprises changing a visual aspect of the game, wherein the visual aspect of the game comprises a size, color, speed and/or shape of a rendered game component.

12. The method of claim 10, wherein calibrating the game comprises changing a visual aspect of the game, wherein the visual aspect of the game comprises a background image, brightness, contrast, and/or gamma compensation of the display screen.

13. The method of claim 1, wherein the viewer comprises a first viewer of a plurality viewers,
    wherein displaying the first object and the second object to the viewer on the display screen of the electronic gaming machine comprises displaying the first object and the second object to the plurality of viewers on the display screen of the electronic gaming machine,
    wherein detecting and tracking the eye movement of the viewer during the predetermined time period comprises detecting and tracking first eye movement of the first viewer of the plurality of viewers and second eye movement of a second viewer of the plurality of viewers,
    wherein comparing the eye movement of the viewer during the predetermined time period to the displayed movement of the first object or the displayed movement of the second object on the display screen of the electronic gaming machine during the predetermined time period comprises comparing the first eye movement of the first viewer during the predetermined time period to the displayed movement of the first object on the display screen of the electronic gaming machine during the predetermined time period and comparing the second eye movement of the second viewer during the predetermined time period to the displayed movement of the second object on the display screen of the electronic gaming machine during the predetermined time period; and
    wherein determining that the viewer is visually tracking the first object based on a similarity of the eye movement of the viewer during the predetermined time period and the displayed movement of the first object on the electronic gaming machine during the predetermined time period comprises determining that the first viewer is visually tracking the first object based on a similarity of the first eye movement of the first viewer during the predetermined time period and the displayed movement of the first object on the electronic gaming machine during the predetermined time period and determining that the second viewer is visually tracking the second object based on a similarity of the second eye movement of the second viewer during the predetermined time period and the displayed movement of the second object on the electronic gaming machine during the predetermined time period.

14. The method of claim 1, wherein detecting and tracking eye movement of the viewer during the predetermined time period comprises detecting and tracking the eye movement of the viewer during the predetermined time period without providing instructions requesting the viewer visually follow the first object or the second object.

15. The method of claim 1, wherein determining that the viewer is visually tracking the first object is independent from determining a line of sight of the viewer.

16. The method of claim 1, wherein detecting and tracking the eye movement of the viewer during the predetermined time period comprises:
illuminating an eye of the viewer with infrared or near-infrared light; and
sensing the infrared or near-infrared light reflected from the eye.

17. An electronic gaming machine, comprising:
a game controller;
a display device;
a display controller coupled to the game controller and the display device; and
an eye movement detection unit coupled to the game controller and configured to detect eye movement of a viewer;
wherein the game controller is configured to:
display a first object and a second object to the viewer of the electronic gaming machine using the display device, the first object and the second object each moving between different positions on the display screen in predetermined movements during a predetermined time period;
detect and track eye movement of the viewer during a predetermined time period;
compare the eye movement of the viewer during the predetermined time period to a displayed movement of the first object or a displayed movement of the second object on the display screen during the predetermined time period;
responsive to comparing the eye movement of the viewer during the predetermined time period to the displayed movement of the first object or the displayed movement of the second object on the display screen of the electronic gaming machine during the predetermined time period, determine that the viewer is visually tracking the first object based on a similarity of the eye movement of the viewer during the predetermined time period and the displayed movement of the first object on the electronic gaming machine during the predetermined time period; and
execute an action in a game on the electronic gaming machine in response to determining that the eye of the viewer is visually tracking the first object.

18. The electronic gaming machine of claim 17, wherein the game controller is further configured to:
display the first object and/or the second object moving in a repeating predetermined pattern during the predetermined time period.

19. The electronic gaming machine of claim 17, wherein the game controller is further configured to:
display the second object to the viewer of the electronic gaming machine in a separate location on the display screen from the first object during the predetermined time period.

20. The electronic gaming machine of claim 19, wherein the game controller is further configured to:
display the first object moving in a first repeating predetermined pattern during the predetermined time period; and
display the second moving object moving in a second repeating predetermined pattern during the predetermined time period,
wherein the first repeating predetermined pattern is different from the second repeating predetermined pattern.

21. The electronic gaming machine of claim 17, wherein the game controller is further configured to:
cause the first object or the second object to move in discontinuous motion from one display position to a next display position; and
detect saccadic motion of the eye of the viewer in response to the discontinuous motion.

22. A method of calibrating an eye movement tracking unit of an electronic gaming machine, comprising:
displaying a first object and a second object to a viewer on a display screen of the electronic gaming machine the first object and the second object each moving between different positions on the display screen in predetermined movements during a predetermined time period;
detecting eye movement of the viewer during the predetermined time period;
comparing the eye movement of the viewer during the predetermined time period to a displayed movement of the first object or a displayed movement of the second object on the display screen during the predetermined time period to determine a similarity between the displayed movement of the first object or the second object during the predetermined time period and the eye movement of the viewer during the predetermined time period and a difference between the displayed movement of the first object or the second object during the predetermined time period and the eye movement of the viewer during the predetermined time period;
responsive to comparing the eye movement of the viewer during the predetermined time period to the displayed movement of the first object or the displayed movement of the second object on the display screen during the predetermined time period, determining that the viewer is visually tracking the first object based on the similarity between the displayed movement of the first object during the predetermined time period and the eye movement of the viewer during the predetermined time period;
responsive to determining that the viewer is visually tracking the first object, calibrating the eye movement tracking unit based on the difference between the displayed movement of the first object during the predetermined time period and the eye movement of the viewer during the predetermined time period; and
responsive to calibrating the eye movement tracking unit based on the difference between the displayed movement of the first object during the predetermined time period and the eye movement of the viewer during the predetermined time period, executing an action in a game on the electronic gaming machine in response to determining that the eye of the view is visually tracking an object.

* * * * *